Patented Nov. 8, 1949

2,487,097

UNITED STATES PATENT OFFICE 2,487,097

X-RAY SCREEN

William H. Byler, Morris Plains, N. J., assignor to United States Radium Corporation, New York, N. Y., a corporation of Delaware No Drawing. Application May 22, 1945, Serial No. 595,259

1 Claim. (Cl. 117—33.5)

This invention relates to improved X-ray screens, that is, screens comprising a base sheet or plate with a coating of luminescent material thereon. Such screens include viewing (fluoroscopic) and intensifying (photographic) screens. In particular it relates to such screens which have increased efficiency, that is, give greater brightness or greater intensification with comparable exposures than do the X-ray screens heretofore available.

The screens of the present invention have a luminous coating which includes a phosphor, that is, luminous material, and, in close association with the phosphor, that is, intimately admixed therewith, a compound containing an element or elements with the atomic weight greater than the atomic weight of the elements contained in the phosphor as principal lattice-forming elements. In particular, the screens of the invention may be made with the zinc sulfide, zinc cadmium sulfide and calcium tungstate phosphors which are used in such screens, in each case the phosphor being in intimate association with a finely divided compound, containing an element with atomic weight greater than zinc (65.37), cadmium (112.40) or tungsten (184.0), respectively.

The quantity of the compound which is included in the screens is relatively small, as compared with the quantity of phosphor. It may be 5% or more, ranging up to 10%, but advantageously will usually be less than 5% for example, 1 to 2%. Even fractions of 1%, e. g., ½% give substantial improvement in the screens. The necessary intimate association of the two materials, that is, the intimate admixture thereof, may be brought about in various ways, as by precipitation of a compound onto a suspension of the phosphor, by admixture of a finely divided compound with the phosphor as by tumbling or the like, or by evaporation of a suspension of the phosphor in a solution of a soluble compound. The precipitation method is advantageously used, because it provides extremely intimate association of a very finely divided insoluble, and therefore inert, compound with the phosphor.

The screens are prepared in the usual way, after the necessary intimate admixture of the phosphor and the compound is obtained, by mixing the dry mixture with an adhesive (lacquer or varnish base), and spreading the resulting mixture on a suitable support.

The luminous materials, that is, phosphors, used in producing the screens of the invention are prepared in the usual way, for example, in the case of zinc sulfide phosphors, by percipitating the zinc sulfide from solutions as free as possible from heavy metal impurities, filtering and drying with care to prevent the introduction of heavy metals. To the dried product are added phosphorogens, such as silver, copper, manganese or gold, or more than one of these, and a small amount of one of the usual fluxing salts, in accordance with usual practice. The mixture is then dried and fired at a temperature of about 900 to 1300° C., to produce a product of the grain size required. In some cases, a phosphorescence inhibitor, such as a small quantity of nickel, may be included in the phosphor. Similarly, other types of phosphors are prepared in the usual ways.

The phosphor so obtained is brought into intimate association with a compound, advantageously by percipitation although, as stated, other appropriate means may be used, and is then incorporated in a suitable adhesive and applied to a suitable support in the usual way.

Selection of the compound used, in addition to the requirement as to the atomic weight stated above, requires also consideration of its color or light absorptive properties. Thus, the compound should be either transparent or should have limited or no absorption in the wave length bands characteristic of the phosphor. A highly colored compound or a compound with a distinct absorptive capacity for light of the wave length characteristic of the phosphor reduces the efficiency of the screen, and therefore is undesirable. Also, the compound should not chemically react with the phosphor to reduce the efficiency of the phosphor through chemical conversion of it or part of it to other materials, and also should be relatively inert. This latter requirement makes advantageous the use of insoluble materials, such as lead phosphate, as distinguished from materials which are readily soluble in water.

The invention will be further illustrated by the following specific examples but it is not limited thereto.

*Example I.*—A zinc-cadmium sulfide phosphor, with silver as the phosphorogen, is stirred into a large volume of water forming a mobile suspension. To the suspension is added, with stirring, a solution of trisodium phosphate, followed by a solution of lead nitrate. A slight excess, corresponding to a few percent over the stoichiometric quantity of trisodium phosphate is used, and the quantity of lead nitrate is such as to correspond to one part of lead to 100 parts of phosphor. When precipitation of the lead phosphate is complete, the phosphor is separated by filtration, and washed with water on the filter until all soluble salts are removed. The product is then dried and screened. The X-ray screen is then prepared by mixing the resulting powder with adhesive and spreading on a support by the usual procedure. In one case, the brightness of a zinc-cadmium sulfide viewing screen was increased 13% by the physical admixture with it, as described, of lead phosphate in amount corresponding to one part of lead to 100 parts of the phosphor.

With a zinc sulfide phosphor, the intensification factor of an intensifying screen was increased 13% by the incorporation therein of one part of lead phosphate, calculated as lead, to 100 parts of the phosphor, the incorporation being accomplished by the procedure described in this example.

*Example II.*—About 2.5 parts of bismuth subcarbonate in the form of a fine powder is tumbled with a dry zinc-cadmium sulfide phosphor until a uniform mixture is obtained. The resulting product is admixed with an adhesive and applied to a screen in the usual fashion.

*Example III.*—To a dilute slurry of a zinc sulfide phosphor in water is added a solution of barium chloride, the quantity of barium chloride being such as to correspond to between 1 and 5% of barium on the phosphor. The resulting slurry is evaporated on a water bath with frequent mixing to insure uniform distribution of the barium chloride. The resulting dry powder is mixed with the adhesive and applied to a screen in the usual way.

A wide range of compounds may be used in the practice of the present invention. Thus, with zinc sulfide phosphors, the following compounds, or mixtures thereof, may be used: strontium carbonate, strontium fluoride, strontium sulfate, molybdenum oxide, stannous orthophosphate, barium chloride, barium carbonate, barium phosphate, barium sulfate, mercury orthophosphate, lead carbonate, lead orthophosphate, lead sulfate, bismuth subcarbonate, bismuth orthophosphate, bismuth subnitrate.

With zinc-cadmium sulfide phosphors those in the above list except for the first four may be used. In addition, the following may be used: tungstic oxide, lead chromate, lead molybdate, lead tungstate, bismuth trioxide.

These latter five compounds are not advantageously used with the zinc sulfide phosphors, because their yellow color interferes with the efficiency of the screen. It does not so interfere with the efficiency of screens made with zinc-cadmium sulfide phosphors.

With calcium tungstate phosphors the following materials may be used: mercury orthophosphate, lead carbonate, lead orthophosphate, lead sulfate, bismuth subcarbonate, bismuth orthophosphate, bismuth subnitrate, thallium orthophosphate, lead acetate, lead chloride, lead arsenate, lead nitrate, bismuth hydroxide.

It should be noted that the foregoing lists of compounds which may be used in the practice of the invention, are given by way of illustration and not limitation, as there are a number of other compounds which may be used in the practice of the invention, as will readily occur to those skilled in the art. The important requirements, in the selection of the compound to be used, are that it shall contain an element of higher atomic weight than those contained in the phosphor itself, should be either colorless or transparent in the region of the characteristic light emission of the phosphor, and should be non-reactive chemically with the phosphor.

I claim:

An X-ray screen responsive to X-ray excitation comprising a support coated with an intimate admixture of luminescent material selected from the group consisting of zinc sulfide and zinc-cadmium sulfide and an inorganic compound selected from the group consisting of stannous orthophosphate, barium chloride, barium carbonate, barium phosphate, barium sulfate, mercury orthophosphate, lead carbonate, lead orthophosphate, lead sulfate, bismuth subcarbonate, bismuth orthophosphate and bismuth subnitrate; in an amount not exceeding 10% of the weight of the luminescent material.

WILLIAM H. BYLER.

REFERENCES CITED

The following references are of record in the file of this patent:

UNITED STATES PATENTS

| Number | Name | Date |
|---|---|---|
| 1,097,981 | Krapf | May 26, 1914 |
| 1,988,605 | Michelssen | Jan. 22, 1935 |
| 2,060,977 | DeBoer | Nov. 17, 1936 |
| 2,110,162 | Leverenz | Mar. 8, 1938 |
| 2,136,871 | Wakenhut | Nov. 5, 1938 |
| 2,317,977 | Cassellini | May 4, 1943 |
| 2,387,512 | Hilberg | Oct. 23, 1945 |

FOREIGN PATENTS

| Number | Country | Date |
|---|---|---|
| 498,370 | Great Britain | Jan. 6, 1939 |